Patented June 5, 1923.

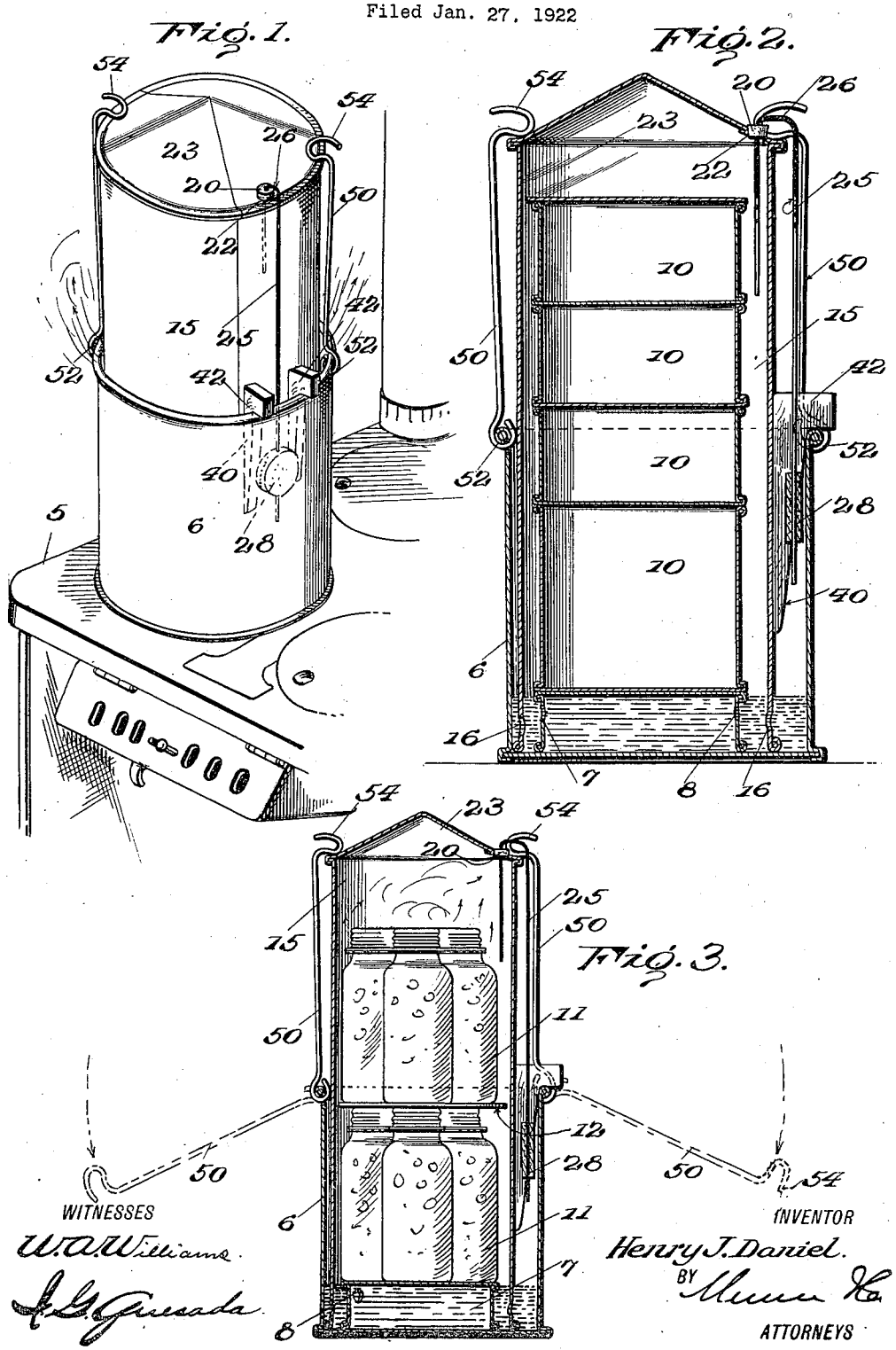

1,457,654

UNITED STATES PATENT OFFICE.

HENRY J. DANIEL, OF SUTHERLIN, VIRGINIA.

COOKING UTENSIL.

Application filed January 27, 1922. Serial No. 532,137.

*To all whom it may concern:*

Be it known that I, HENRY J. DANIEL, a citizen of the United States, and a resident of Sutherlin, in the county of Pennsylvania and State of Virginia, have invented certain new and useful Improvements in Cooking Utensils, of which the following is a specification.

This invention relates to cooking utensils and more particularly to a steamer especially adapted for use in canning or for cooking a number of foods simultaneously.

In the canning receptacles now in use it is desirable to maintain a reasonable steam pressure about the food containing receptacles so as to hasten the cooking and the steam pressure frequently rises above the desired point and exerts a pressure on the water so that the water flows over the side of the main receptacle. It is therefore an important object of this invention to provide novel means whereby the rise of the water level of the outer receptacle due to the increase in steam pressure may be utilized to relieve the steam pressure and thereby prevent the water in the outer receptacle from overflowing onto the stove.

Further an important object of this invention is to provide a low water alarm for steamers of the type forming the subject matter of this application so that when the water drops below a predetermined level the attendant will be advised.

Also the invention forming the subject matter of this application aims to provide a steamer wherein the dome is held in spaced relation to one side of the main receptacle by means of wedges which not only function as wedges but also as guiding devices for the float which actuates the steam let off.

The invention also aims to provide novel means in the nature of disks for supporting the upper layers of jars within the dome so that the several jars will be reliably supported and prevented from tipping over as the result of the expansion of the covers of the lower jars upon being highly heated.

In carrying out the invention the holding arms or latches which securely hold the hood or dome in position are pivotally connected to the main receptacle so that when it is desired to remove the hood and the food containing receptacles, the latches may be swung outwardly to a position where they will not in any way interfere.

A further object is to provide a cooking utensil of the character specified which is of highly simplified construction, desirable in use and cheap to manufacture.

Other objects and advantages of the invention will be apparent during the course of the following description.

In the accompanying drawing forming a part of this application and in which like numerals are employed to designate like parts throughout the same, Figure 1 is a perspective of the improved cooking utensil, Figure 2 is a vertical sectional view through the same, Figure 3 is a vertical sectional view through the same, the view illustrating a plurality of jars within the hood.

In the drawing wherein for the purpose of illustration is shown a preferred embodiment of the invention the numeral 5 designates a stove upon which a main cooking receptacle 6 is adapted to be arranged. As illustrated in Figure 2 the receptacle 6 which may be said to be the main receptacle of the utensil is of cylindrical formation and receives a stool 7 having its lower side open and its top closed. The water level extends to a point adjacent the top of the stool 7 and the steam created within the stool passes off through openings 8 adjacent the top of the stool and circulates about a plurality of food containing receptacles 10 mounted upon the stool. In case the steamer is used for preserving, a plurality of jars 11 may be mounted on the stool and additional sets of jars may be mounted on disks 12 arranged between the sets of jars. By employing the disks 12 the upper sets of jars or cans as the case may be are prevented from tipping over when the caps of the lower sets of jars swell as a result of being heated. The disks 12 are perfectly flat and form a reliable means for supporting the upper sets of jars or cans.

A hood 15 of cylindrical formation is adapted to be extended over the receptacles arranged in superposed relation and also extends over the stool 7 so as to confine the steam generated whereby the cooking is expedited. In other words the hood 15 which is arranged in spaced relation to the stool 7 and the food containing receptacles defines an annular chamber into which the steam under pressure passes and the presence of the steam under a reasonable pressure greatly hastens the cooking operation.

With reference to Figure 2 it will be observed that the water in the receptacle is arranged on the inner and outer sides of the hood and that communication is established between the inner and outer sides of the hood by means of one or more openings 16 adjacent the lower end of the hood. When the water level drops below a predetermined point the steam within the hood will lower the level of the water and pass out through the openings 16. As the steam leaves the opening 16 it will bubble upwardly through the water and cause a noise which will advise the attendant of the fact that the water has dropped below a predetermined level whereupon the attendant proceeds to replenish the water supply. However, when the water is at a proper level the pressure of the steam will not be sufficient to press the water within the hood beneath the level of the openings 16.

As previously stated it is desirable to maintain a reasonable degree of steam pressure within the hood 15 so as to expedite the cooking operation. However, an excessive steam pressure is undesirable and I therefore provide a valve 20 which may be extended into an opening 22 in the cone-shaped top 23 of the hood. The valve 20 is freely received in the opening 22 and serves only to smother the steam whereby to maintain a reasonable pressure within the hood. That is to say, the valve 20 which is somewhat light in weight does not absolutely prevent the escape of steam but permits a small quantity of steam to escape.

The valve is connected to one branch of a U-shaped stem 25 adjacent the bight portion 26 of the stem and the stem extends downwardly on the outside of the hood and has a float 28 connected thereto. The float 28 is adapted to be elevated as the water rises due to excessive steam pressure within the hood. That is to say when the steam pressure within the hood exceeds a predetermined point the water is forced upwardly on the outside of the hood and elevates the float 28.

The elevation of the float 28 will of course elevate the valve 20 so that the excess steam will be allowed to escape. As the excess steam escapes the level of the water exteriorly of the hood will recede and thereby permit the valve 20 to reseat.

As illustrated in Figure 2 the float 28 is located below the upper edge of the main receptacle 6 so that the valve 20 is caused to open before the water level reaches the top of the main receptacle. This prevents the water from overflowing due to the creation of excessive steam in the hood. It is thus seen that the float 28 not only serves as a means to relieve the hood of excess steam pressure but also as a means to prevent the water in the main receptacle from overflowing.

The float 28 is adjustable on the stem to different levels so that it will act at the proper steam pressure. If it is desired to cause the valve to open at a high pressure the float is positioned near the top of the main receptacle and if it is desired to cause the opening of the valve at a low pressure the float is lowered.

The hood 15 is held against lateral movement by means of a pair of tapered wedges 40 having heads 42 extended laterally and adapted to engage the upper edge of the main receptacle, whereby the downward movement of the wedges is limited. Of course as the wedges 40 are tightly driven between the main receptacle 6 and the hood one side of the hood is maintained in spaced relation to the main receptacle. The wedges 40 not only serve as a means for holding the hood against lateral movement but also constitute guides located on opposite sides of the float 28 so that the float is caused to move vertically upon the rise of the water level.

The hood may be held against vertical movement by means of a pair of holding arms 50 having their rear portions formed with eyes 52 connected to the upper portion of the main receptacle. The arms 50 are thus swingingly connected to the main receptacle and the outer terminal portions of the same are formed with U-shaped hooks 54 having engagement with the top 23 of the hood. The upper branches of the U-shaped hooks define finger pieces by means of which the hooks may be released from engagement with the hood.

When it is desired to remove the hood the arms 50 may be swung outwardly and downwardly to inoperative position and do not in any way interfere with the removal of the hood or the food containing receptacles.

Furthermore, as the arms rest at the sides of the main receptacle 6 when not in use, the hood and the jars 11 may be readily and conveniently placed in position and the arms subsequently moved upwardly to their inoperative positions. It will be seen that when the arms are swung downwardly to their inoperative positions the hood may be readily inserted into the main receptacle and in case the arms 50 were carried by the hood, as they are in receptacles now in use, the arms would interfere with the insertion of the hood in the main receptacle. In other words the arms 50 would engage the top of the main receptacle and thereby prevent the hood from being conveniently inserted into the main receptacle.

In operation the food containing receptacles are mounted in superposed relation on the stool 7 and after placing a suitable quantity of water in the main receptacle the hood is placed in position and secured by means of the arms 50 and the wedges 40. The main receptacle is now placed upon a stove as indicated in Figure 1 and the resulting creation of steam fills the hood 23 and thereby hastens the cooking operation.

When the steam exceeds a predetermined point the level of the water exteriorly of the hood rises and thereby elevates the valve 28 so as to also elevate the valve 20. When the valve 20 is thus elevated the steam pressure is relieved and the water level exteriorly of the hood recedes thereby preventing an overflow. One branch of the U-shaped stem 25 functions as a guide for returning the valve 20 to its seated position.

When the level of the water drops below a predetermined point the steam within the hood passes out through the opening 16 and causes a bubbling noise which advises the attendant of the fact that the water is low.

Having thus described the invention what I claim is:—

1. A cooking utensil comprising a main receptacle, a hood extending into the main receptacle and adapted for the reception of steam, said hood being provided with a steam outlet, a valve for normally closing said steam outlet, and a float arranged within said main receptacle and constituting a means to elevate said valve, said float being located beneath the top of the main receptacle whereby to relieve the steam pressure prior to the overflow of water in the main receptacle.

2. A cooking utensil comprising a main receptacle, a hood extended into the main receptacle and having a steam outlet, a valve extended over said steam outlet, a stem connected to said valve, a float mounted on said stem and arranged beneath the upper end of said main receptacle and actuated by the water in the main receptacle whereby to elevate said valve when the water rises above a predetermined point.

3. The construction set forth in claim 2, and wedges arranged between said hood and said main receptacle on opposite sides of said float, whereby to guide the same.

4. A cooking receptacle comprising a main receptacle, a hood extended into the receptacle and terminating a substantial distance above the same, the upper end of the hood being provided with a steam outlet opening, a valve extending over said opening whereby to maintain a steam pressure in the hood, a U-shaped stem having a short branch extending through the valve and said opening and constituting a guide for said valve, said U-shaped stem being provided with a long branch extended exteriorly of the hood and terminating below the top of said main receptacle, a float adjustably mounted on said stem and actuated by the rise of the water level exteriorly of the hood, due to the increase in steam pressure within the hood above a predetermined point, and a pair of spacing members confined between the main receptacle and said hood and constituting guiding devices for said float.

5. A cooking utensil comprising a main receptacle, a hood arranged in the main receptacle and terminating above the same, the upper end of the hood being provided with a steam outlet opening, a valve for closing said opening whereby to maintain steam pressure in the hood, a U-shaped stem having a branch connected to said valve and having a second branch arranged exteriorly of the hood and terminating below the top of the main receptacle, and a float adjustably mounted on said exteriorly arranged branch and actuated by the rise and fall of the water exteriorly of the hood due to the increase in steam pressure within the hood above a predetermined point.

HENRY J. DANIEL.